(12) United States Patent  
Sharifi et al.

(10) Patent No.: US 9,123,330 B1
(45) Date of Patent: Sep. 1, 2015

(54) LARGE-SCALE SPEAKER IDENTIFICATION

(71) Applicant: Google Inc., Mountain View, CA (US)

(72) Inventors: Matthew Sharifi, Zurich (CH); Dominik Roblek, Mountain View, CA (US)

(73) Assignee: Google Inc., Mountain View, CA (US)

( * ) Notice: Subject to any disclaimer, the term of this patent is extended or adjusted under 35 U.S.C. 154(b) by 96 days.

(21) Appl. No.: 13/875,001

(22) Filed: May 1, 2013

(51) Int. Cl.
| | | |
|---|---|---|
| *G10L 17/00* | (2013.01) | |
| *G10L 15/00* | (2013.01) | |
| *G10L 21/00* | (2013.01) | |
| *G10L 25/00* | (2013.01) | |
| *G06F 3/00* | (2006.01) | |
| *G06F 3/048* | (2013.01) | |
| *H04H 60/32* | (2008.01) | |
| *H04N 7/173* | (2011.01) | |
| *G10L 19/018* | (2013.01) | |
| *G06F 17/30* | (2006.01) | |
| *G06F 21/16* | (2013.01) | |

(52) U.S. Cl.
CPC ......... *G10L 19/018* (2013.01); *G06F 17/30017* (2013.01); *G06F 17/30749* (2013.01); *G06F 17/30769* (2013.01); *G06F 17/30864* (2013.01); *G06F 21/16* (2013.01)

(58) Field of Classification Search
CPC .............. G06F 21/16; G06F 17/30864; G06F 17/30017; G06F 17/30749; G06F 17/30769
USPC ........................................ 704/231, 270, 270.1
See application file for complete search history.

(56) References Cited

U.S. PATENT DOCUMENTS

| | | | | |
|---|---|---|---|---|
| 3,919,479 | A | * | 11/1975 | Moon et al. .................. 704/237 |
| 6,088,455 | A | * | 7/2000 | Logan et al. ................. 380/200 |
| 6,567,775 | B1 | | 5/2003 | Maali et al. |
| 6,901,366 | B1 | * | 5/2005 | Kuhn et al. ................... 704/275 |
| 6,931,451 | B1 | * | 8/2005 | Logan et al. ................. 709/231 |
| 6,968,337 | B2 | * | 11/2005 | Wold ................................ 1/1 |
| 7,184,955 | B2 | * | 2/2007 | Obrador et al. .............. 704/231 |
| 7,328,153 | B2 | * | 2/2008 | Wells et al. .................. 704/231 |
| 7,346,512 | B2 | * | 3/2008 | Li-Chun Wang et al. ..... 704/270 |
| 7,444,353 | B1 | | 10/2008 | Chen et al. |
| 7,991,770 | B2 | * | 8/2011 | Covell et al. ................. 707/722 |
| 8,082,504 | B1 | * | 12/2011 | Tischer ......................... 715/720 |

(Continued)

FOREIGN PATENT DOCUMENTS

EP 1692629 B1 6/2011

OTHER PUBLICATIONS

Nilesh V. Patel ; Ishwar K. Sethi; Video classification using speaker identification. Proc. SPIE 3022, Storage and Retrieval for Image and Video Databases V, 218 (Jan. 15, 1997); doi:10.1117/12.263411.*

(Continued)

*Primary Examiner* — Matthew Baker
(74) *Attorney, Agent, or Firm* — Fish & Richardson P.C.

(57) ABSTRACT

Methods, systems, and apparatus, including computer programs encoded on a computer storage medium, for receiving audio data encoding ambient sounds, identifying media content that matches the audio data, and a timestamp corresponding to a particular portion of the identified media content, identifying a speaker associated with the particular portion of the identified media content corresponding to the timestamp, and providing information identifying the speaker associated with the particular portion of the identified media content for output.

23 Claims, 3 Drawing Sheets

(56) References Cited

U.S. PATENT DOCUMENTS

| | | | |
|---|---|---|---|
| 8,121,843 B2* | 2/2012 | Rhoads et al. | 704/270.1 |
| 8,358,749 B2* | 1/2013 | Chang et al. | 379/88.04 |
| 8,392,183 B2* | 3/2013 | Weber | 704/231 |
| 8,606,579 B2* | 12/2013 | Rasmussen | 704/246 |
| 2003/0107592 A1* | 6/2003 | Li et al. | 345/745 |
| 2003/0231746 A1* | 12/2003 | Hunter et al. | 379/88.01 |
| 2003/0236663 A1* | 12/2003 | Dimitrova et al. | 704/245 |
| 2004/0199387 A1* | 10/2004 | Wang et al. | 704/243 |
| 2005/0033758 A1* | 2/2005 | Baxter | 707/100 |
| 2005/0229107 A1* | 10/2005 | Hull et al. | 715/764 |
| 2006/0262887 A1* | 11/2006 | Lombardo et al. | 375/350 |
| 2007/0061352 A1* | 3/2007 | Dimitrova et al. | 707/102 |
| 2007/0106693 A1* | 5/2007 | Houh et al. | 707/104.1 |
| 2007/0106760 A1* | 5/2007 | Houh et al. | 709/219 |
| 2007/0112837 A1* | 5/2007 | Houh et al. | 707/102 |
| 2007/0124756 A1* | 5/2007 | Covell et al. | 725/18 |
| 2007/0130580 A1* | 6/2007 | Covell et al. | 725/18 |
| 2007/0143778 A1* | 6/2007 | Covell et al. | 725/19 |
| 2008/0270344 A1* | 10/2008 | Yurick et al. | 707/2 |
| 2010/0257070 A1* | 10/2010 | Panje | 705/27 |
| 2010/0322469 A1* | 12/2010 | Sharma | 382/100 |
| 2011/0035382 A1* | 2/2011 | Bauer et al. | 707/741 |
| 2011/0063317 A1* | 3/2011 | Gharaat et al. | 345/545 |
| 2011/0247042 A1* | 10/2011 | Mallinson | 725/86 |
| 2012/0084087 A1* | 4/2012 | Yang et al. | 704/246 |
| 2013/0007043 A1* | 1/2013 | Phillips et al. | 707/769 |
| 2013/0166303 A1* | 6/2013 | Chang et al. | 704/258 |
| 2014/0007152 A1* | 1/2014 | Pora et al. | 725/18 |
| 2014/0026195 A1* | 1/2014 | Marshall | 726/4 |
| 2014/0122059 A1* | 5/2014 | Patel et al. | 704/9 |
| 2014/0196070 A1* | 7/2014 | Moskowitz et al. | 725/19 |

OTHER PUBLICATIONS

Turetsky, R.; Dimitrova, N., "Screenplay alignment for closed-system speaker identification and analysis of feature films," Multimedia and Expo, 2004. ICME '04. 2004 IEEE International Conference on, vol. 3, No., pp. 1659,1662 vol. 3, Jun. 27-30, 2004.*

Nam J et al: "Speaker Indentification and video analysis for hierarchical video shot classification" Image Processing, 1997. Proceedings International Conference on Santa Barbara, CA, US Oct. 26-29, 1997.*

Fink, M., Covell, M., and Baluja, S. 2006. Socialand interactive television: Applications based on real-time ambient-audio identification. In Proceedings of the EurolTV 2006 Conference (Athens), 138-146.*

Campbell, Joseph P., "Speaker Recognition: A Tutorial," Proceedings of the IEEE, vol. 85, Issue 9, Sep. 1997, 26 pages.

* cited by examiner

LARGE-SCALE SPEAKER IDENTIFICATION

TECHNICAL FIELD

This document relates to speaker identification, and one particular implementation relates to identifying media content that matches background audio, and identifying a speaker that is associated with the media content

BACKGROUND

A person may hear another person speaking, and may want to identify that person. For example, a person listening to a speech may want to identify the speaker, as a starting point for conducting additional research into the speaker or the speech.

SUMMARY

A user listening to a speaker can request to learn the identity of the person that is speaking. For example, a user can ask a question about a movie they are viewing by saying, "Who is this person speaking?" The user's computing device can detect the user's utterance and ambient audio data from the environment of the user, which can include dialogue of the movie that the user is viewing. The computing device can encode the spoken utterance and the ambient audio data as waveform data, and can provide the waveform data to a server-based computing environment.

The computing environment can separate the ambient audio data from the spoken utterance, and can use the ambient audio data that includes the dialogue of the movie to identify the speaker. Using the ambient audio data that includes the dialogue of the movie, the computing environment can identify particular media content associated with the dialogue of the movie as well as a timestamp corresponding to a particular portion of the media content. The computing environment identifies the active speaker during the particular portion of the media content corresponding to the identified timestamp. Based on identifying the speaker, the computing environment can access information relating to the identified speaker, and can provide such information for output to the user of the computing device.

Innovative aspects of the subject matter described in this specification may be embodied in methods that include the actions of receiving audio data encoding ambient sounds, identifying media content that matches the audio data, and a timestamp corresponding to a particular segment of the identified media content, identifying a speaker associated with the particular segment of the identified media content corresponding to the timestamp, and providing information identifying the speaker associated with the particular segment of the identified media content for output.

Other embodiments of these aspects include corresponding systems, apparatus, and computer programs, configured to perform the actions of the methods, encoded on computer storage devices.

These and other embodiments may each optionally include one or more of the following features. In various examples, receiving the audio data encoding the ambient sounds further comprises detecting a user input indicating a request to identify a speaker and receiving the audio data encoding ambient sounds based on detecting the user input; detecting the user input indicating a request to identify a speaker comprises detecting a spoken utterance input by the user; detecting the user input indicating a request to identify a speaker comprises detecting a user selection of a control; identifying media content that matches the audio data comprises obtaining audio fingerprints of the audio data, comparing the audio fingerprints of the audio data to audio fingerprints of prerecorded versions of media content, and identifying particular media content that matches the audio based on determining that the audio fingerprints of the audio data match the audio fingerprints of the particular media content; identifying a timestamp corresponding to a particular segment of the identified media content comprises segmenting prerecorded versions of media content, assigning timestamps to each of the segments of the prerecorded versions of media content, obtaining audio fingerprints of each of the segments of the prerecorded versions of media content, obtaining audio fingerprints of the audio data, comparing the audio fingerprints of the audio data to the audio fingerprints of each of the segments of the prerecorded versions of media content, and identifying a timestamp corresponding to a particular segment of particular media content based on determining that the audio fingerprints of the audio data match the audio fingerprints of the particular segment of particular media content; and identifying a speaker associated with the particular segment of the identified media content corresponding to the timestamp comprises accessing information that identifies timestamps and speakers associated with those timestamps for various media content, identifying, from among the information that identifies timestamps and speakers associated with those timestamps for various media content, a timestamp that is the timestamp corresponding to the particular segment of the identified media content, and identifying, as the speaker associated with the particular segment of the identified media content corresponding to the timestamp, the speaker associated with the identified timestamp.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF DRAWINGS

Like reference symbols in the various drawings indicate like elements.

DETAILED DESCRIPTION

Figure 1:
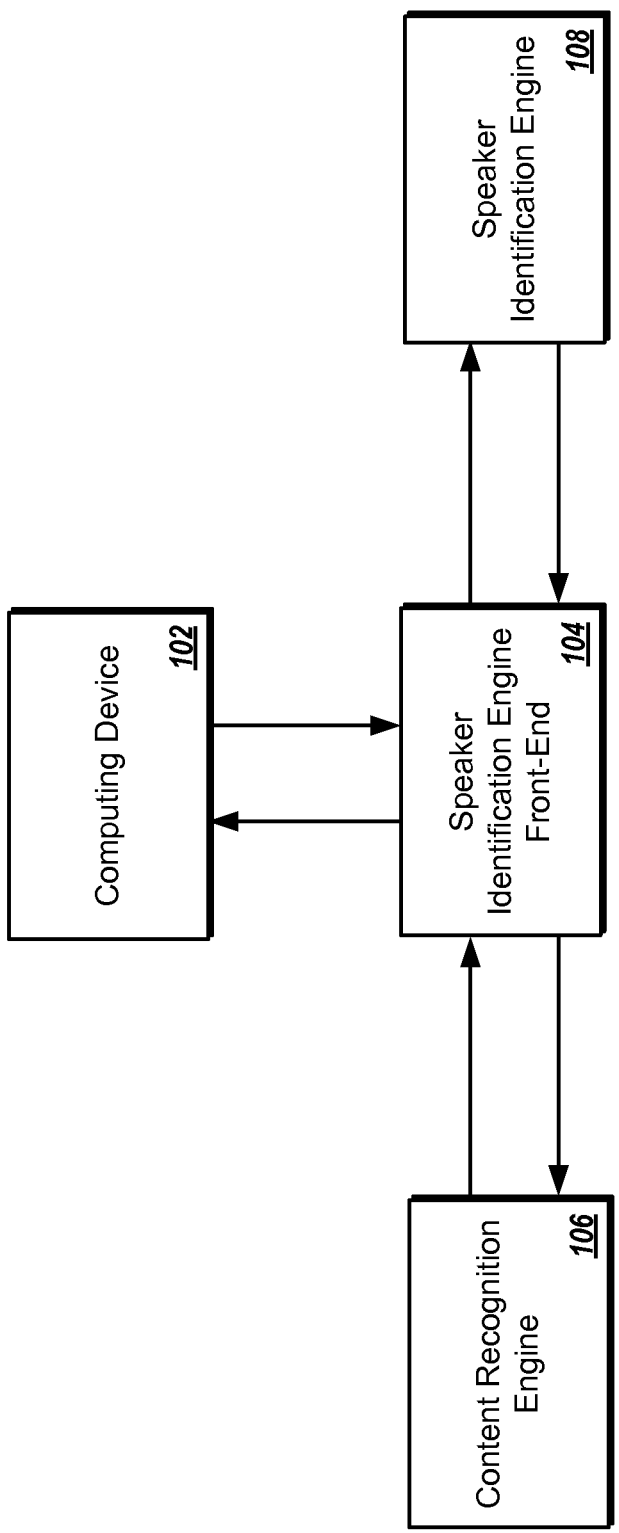
FIG. 1 is an example of a system that can be used for performing large-scale speaker identification.

FIG. 1 depicts a system 100 for performing large-scale speaker identification. For example, a user can request information relating to a speaker they are listening to by providing an input to a computing device, such as by saying, "Who is this person speaking?" or "Who is that?" and can receive an output identifying the speaker and, optionally, information relating to the identified speaker. Identifying the speaker and information relating to the identified speaker can involve obtaining ambient audio data from the environment of the user and identifying the speaker based on the ambient audio data.

The system 100 includes a computing device 102, a speaker identification engine front-end 104, a content recognition engine 106, and a speaker identification engine 108. The speaker identification engine front-end 104 can be in communication with any of the computing device 102, the content recognition engine 106, and/or the speaker identification engine 108 over one or more networks, such as one or more local area networks (LAN) or wide area networks (WAN), such as the Internet.

The content recognition engine 106 can receive ambient audio data obtained by the computing device 102 from the environment of the user. Based on the ambient audio data, the content recognition engine 106 can recognize a prerecorded content item playing in the environment of the user as well as identify a timestamp indicating a particular segment of the recognized content item, i.e., a particular portion of the recognized content item.

As used in this document, prerecorded content can include any content that has been stored in a digital format and that is accessible via one or more networks, e.g., a movie, television show, podcast, audio book, news broadcast, commercial, sporting event, radio show, etc. The speaker identification engine 108 receives information relating to the recognized content item and can perform large-scale speaker identification to identify a speaker based on the information. As used in this specification, large-scale speaker identification refers to the capability of the system 100 to identify an active speaker in content from amongst a large database of candidate speakers associated with prerecorded content items. In some implementations, the content recognition engine 106 receives the ambient audio data from the speaker identification engine front-end 104 over one or more networks. In some implementations, the speaker identification engine 108 receives the information relating to the recognized content item from the speaker identification engine front-end 104 over one or more networks.

When listening to or viewing content, a user can request to know the identity of a particular person or character that is speaking in the content. For example, the content can be a movie and the user can hear the phrase, "Here's looking at you, kid," while watching the movie, "Casablanca." The user can request the identity of the person speaking the phrase by saying, "Who is this person speaking?"

In some instances, the user can provide the request at a computing device 102 associated with the user, for example, by providing the request at a user interface of the computing device 102. In some embodiments, the input received at the computing device 102 can be a spoken utterance, for example, the phrase, "Who is this person speaking?" In other embodiments, the input can be a typed text, e.g., an input typed by the user, a user selection of a control, e.g., a user selection of a button at a user interface, an input using a mind-machine interface, etc.

The computing device 102 can collect ambient audio data from the environment of the user. In some instances, the computing device 102 can determine that a user has provided an input and can detect ambient audio data in response to receiving the user input, such as by using a microphone associated with the computing device 102. For example, the computing device 102 can determine that a user has provided a spoken utterance as input to the computing device 102, and based on detecting that the user has provided the input, can obtain ambient audio data from the environment of the user. In other implementations, the ambient audio data can be obtained before the receipt of the user input, or concurrently with the user input. In some instances, ambient audio data is collected continuously, and based on receiving a user input, a subset of the ambient audio data can be selected and analyzed to identify a speaker. In some instances, privacy controls available to a user of the computing device 102 can be used to determine when ambient audio data is obtained, e.g., whether ambient audio data is collected continuously.

User input data and ambient audio data can be transmitted from the computing device 102 and received by the speaker identification engine front-end 104. For example, the speaker identification engine front-end 104 can receive data relating to a spoken utterance that includes the phrase, "Who is this person speaking?" as well as ambient audio data that includes the dialogue of a movie that the user is viewing.

User input data received by the speaker identification engine front-end 104 can be used to determine an action requested by a user. For example, data relating to a spoken utterance that includes the phrase, "Who is this person speaking?" can be received at the speaker identification engine front-end 104 and used to determine an action requested by the user. Based on user input data being data encoding a spoken utterance input by the user, the speaker identification engine front-end 104 can determine an action requested by the user by transcribing the spoken utterance corresponding to the user input and identifying a requested action based on the transcription.

The speaker identification engine front-end 104 can determine a user-input voice command associated with the utterance by generating the transcription of the utterance and using the transcription to determine a voice command. For example, the speaker identification engine front-end 104 can determine a voice command by comparing the transcription of the spoken utterance to one or more phrases or patterns associated with candidate actions that the system can perform. Generating the transcription can include transcribing the utterance into text or text-related data, thereby providing a written form representation of the language of the spoken utterance. For example, the speaker identification engine front-end 104 can transcribe an utterance spoken by a user to obtain the transcription, "Who is this person speaking," and can use the transcription to determine that the voice command input by the user is a request to identify a speaker in ambient audio data obtained from the environment of the user.

In some implementations, the speaker identification engine front-end 104 identifies a user-requested action based on the transcription of the spoken utterance by determining that the transcription matches a phrase related to performing large-scale speaker identification, e.g., that the phrase, "Who is this person speaking?" matches a phrase that is classified as relating to a request to perform speaker identification on ambient audio data collected from the environment of the user. For example, phrases classified as relating to a request to identify a speaker in prerecorded content can include the phrases, "Who said this," "Who is this person," "Who's that," "Who is talking," etc., and the speaker identification engine front-end 104 can determine that the transcription of the user input, "Who is this person speaking," matches the phrase, "Who is this person." Based on determining that the transcription, "Who is this person speaking," matches the phrase, "Who is this person," the speaker identification engine front-end 104 can determine that the user input is a request to perform speaker identification relating to ambient audio data obtained from the environment of the user.

In other embodiments, the speaker identification engine front-end 104 can compare a transcription of a spoken utterance input by a user to one or more grammar patterns associated with one or more candidate voice commands, and can determine that the transcription corresponds to a request to perform large-scale speaker identification using ambient audio data from the user's environment.

For example, the speaker identification engine front-end 104 can store information identifying grammar patterns that include the patterns, "Who <placeholder>," "<placeholder> is speaking," and "<placeholder> said that." Placeholders in the grammar patterns can enable various transcriptions to match a grammar pattern without a need to explicitly include all possible variations of transcriptions that match that grammar pattern.

For example, the placeholder corresponding to the grammar pattern, "Who <placeholder>," can have a format that includes a verb followed by a pronoun and optionally followed by a noun, i.e., "Who+<verb>+<pronoun>+<noun (optional)>." Based on obtaining the transcription, "Who is this person speaking," the semantic interpretation engine 106 can determine that the transcription matches the grammar pattern, "Who <placeholder>," relating to a request to perform speaker identification on a content item associated with ambient audio data.

In some instances, the language elements of a placeholder, e.g., a noun, verb, or pronoun, can be associated with one or more acceptable terms that can be used to satisfy particular elements of the placeholder. For example, the grammar pattern, "Who <placeholder>" associated with a request to perform speaker identification on a content item associated with ambient audio data and having a placeholder format that includes a verb followed by a pronoun and optionally followed by a noun, i.e., "Who+<verb>+<pronoun>+<noun (optional)>," can have one or more acceptable terms that can satisfy a particular language element of the placeholder. For example, the noun element of the placeholder can be associated with the acceptable terms "person," "speaker," "actor," "reporter," etc. To satisfy the placeholder, i.e., for the transcription to be identified as matching the particular placeholder associated with the grammar pattern, "Who <placeholder>," the particular term of the transcription corresponding to the optional noun element of the placeholder can match one of the acceptable terms.

In some embodiments, user inputs are received as typed text, and are analyzed by the speaker identification engine front-end 104 to determine an action requested by a user based on the typed text. For example, a user input can be typed text, e.g., an input typed by a user, and the speaker identification engine front-end 104 can compare the text of the user input to the phrases and/or grammar patterns maintained at the speaker identification engine front-end 104 to determine a requested action based on the typed text. For example, an input received as typed text can be identified as a request to perform large-scale speaker identification using ambient audio data based on identifying that the typed text matches a phrase and/or grammar pattern associated with performing large-scale speaker identification.

In other embodiments, a user input can include a user selection of a control, and data associated with the user selection of the control can be received at the speaker identification engine front-end 104. For example, a user can select an option or button available or displayed at a user interface of a computing device 102, and the speaker identification engine front-end 104 can receive data associated with the user selection of the option or button. Based on receiving the information relating to the user selection of the control, the speaker identification engine front-end 104 can determine whether the user input is associated with a request to perform a speaker identification process using ambient audio data.

The content recognition engine 106 can receive ambient audio data obtained at the environment of the user and can recognize a prerecorded content item and a timestamp indicating a particular segment of the prerecorded content item. For example, the content recognition engine 106 can receive ambient audio data obtained at the computing device 102, e.g., using a microphone of the computing device 102, and can recognize a prerecorded content item based on the ambient audio data.

In addition, in some examples, the ambient audio data is also used to determine a timestamp associated with a segment of a content item, e.g., a point in time of the recognized prerecorded content item that features the portion of the content item included in the ambient audio data. For example, ambient audio data received at the content recognition engine 106 can include the phrase, "Here's looking at you, kid," and the content recognition engine 106 can recognize the content item as the movie, "Casablanca." In addition, the content recognition engine 106 can identify a timestamp indicating a segment of the movie that features the phrase, "Here's looking at you, kid," i.e., a point in time in the movie when the phrase, "Here's looking at you, kid," is said by a character of the movie.

In some implementations, the content recognition engine 106 is a content fingerprinting engine that utilizes content fingerprinting using wavelets to recognize the content item. The content recognition engine 106 can maintain a database of preprocessed, prerecorded content, where each prerecorded content item in the database has been fingerprinted. The content recognition engine 106 can recognize the content item contained in the ambient audio data by fingerprinting the ambient audio data and comparing the fingerprints of the ambient audio data to the audio fingerprints associated with the prerecorded content items to recognize the content item corresponding to the ambient audio data. The content recognition engine 106 can additionally determine a timestamp indicating a particular segment of the recognized content item. For example, the timestamp can indicate a point in time of the recognized content item when the portion of the content item contained in the ambient audio data occurs, e.g., a timestamp identifying the segment of the movie "Casablanca," that features the phrase, "Here's looking at you, kid."

The speaker identification engine 108 can identify an active speaker associated with a particular segment of a prerecorded content item. In some embodiments, the speaker identification engine 108 receives information identifying a content item and a timestamp indicating a particular segment of the content item, and identifies an active speaker associated with the particular segment of the content item identified by the timestamp. For example, the speaker identification engine 108 can receive data identifying the movie "Casablanca" and a timestamp associated with the segment of the movie that features the phrase, "Here's looking at you, kid."

To determine an active speaker associated with the particular segment of the content item, the speaker identification engine 108 can access a database that maintains information identifying active speakers in prerecorded content for a corpus of prerecorded content items. As used in this document, an active speaker is defined as the speaker classified as the predominant speaker for a particular timestamped segment of content, e.g., the speaker that is speaking for the majority of the timestamped segment of the content item, or, in the case of video content, the speaker that is pictured in the video of the timestamped segment of the content item. For example, the speaker identification engine 108 can maintain a database that includes timestamps for the movie "Casablanca" as well as active speakers corresponding to those timestamps. Based on receiving information identifying the content item as the movie "Casablanca" and a timestamp identifying a segment of the movie that contains the phrase, "Here's looking at you, kid," the speaker identification engine 108 can determine that the active speaker corresponding to the particular timestamp is the actor "Humphrey Bogart" playing the character, "Rick Blaine."

In addition to identifying the active speaker associated with the particular segment of the content item, the speaker identification engine 108 can determine additional information relating to the content item and/or the speaker. For example, the speaker identification engine 108 can identify additional information relating to the movie, e.g., a plot summary, production year, director, or other information associated with the movie "Casablanca," additional information relating to the character "Rick Blaine" from the movie "Casablanca," or additional information relating to the actor "Humphrey Bogart."

Based on determining a speaker associated with the particular point in time of the recognized content item, the speaker identification engine 108 can provide information identifying the active speaker and other relevant information to the speaker identification engine front-end 104. Based on receiving the information identifying the active speaker and the other relevant information, the speaker identification engine front-end 104 can provide the information identifying the active speaker and the other relevant information to the computing device 102. In some instances, providing the information to the computing device 102 can involve providing the information to the computing device 102 over one or more networks. In some embodiments, providing the information identifying the speaker and the other information to the computing device 102 can enable the information identifying the active speaker and other relevant information to be output to a user, for example, at a display of the computing device 102 associated with the user.

Figure 2:
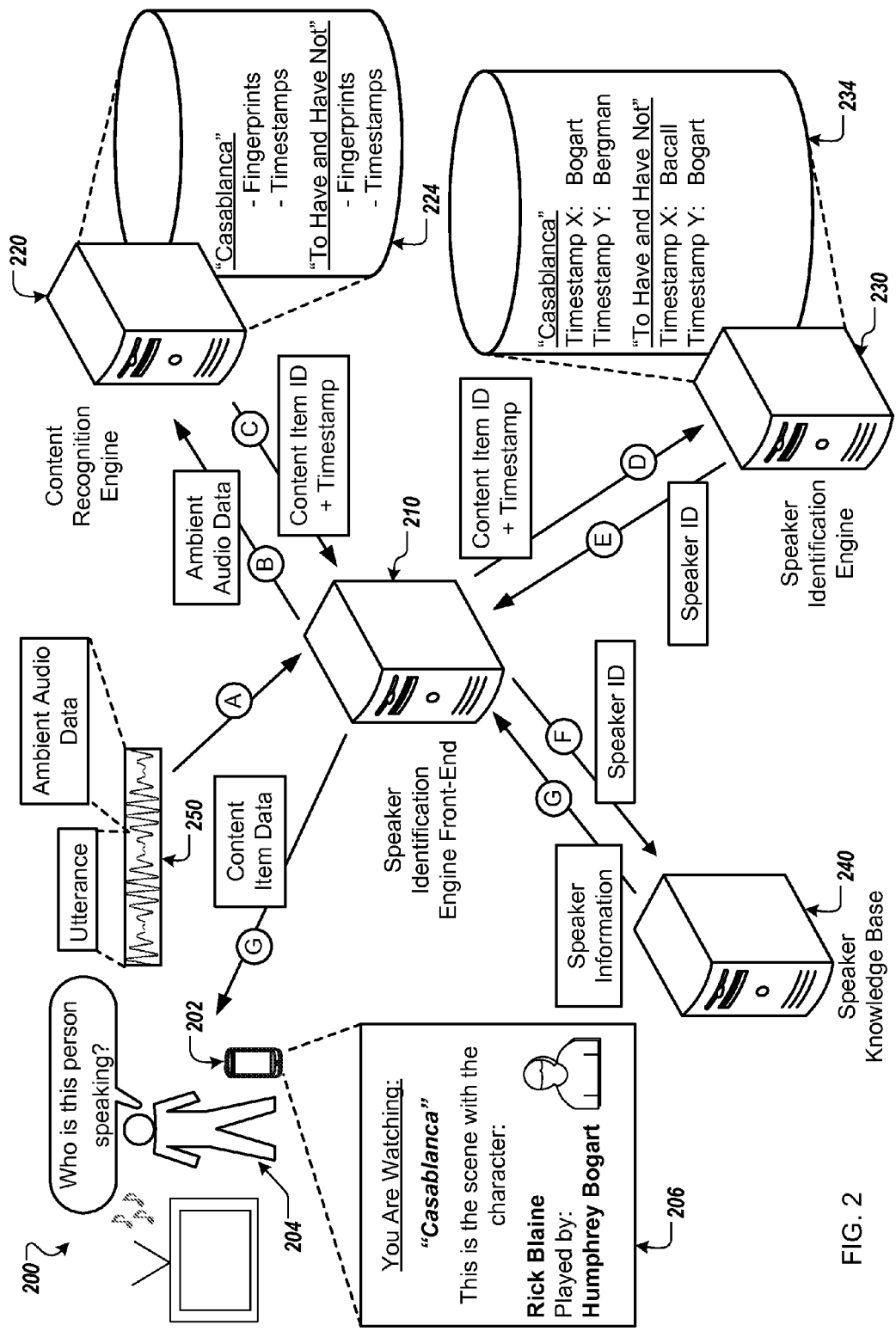
FIG. 2 depicts an example system for performing large-scale speaker identification.

FIG. 2 depicts a system 200 for performing large-scale speaker identification based on ambient audio data that contains prerecorded content. Briefly, the system 200 can identify a speaker associated with a particular moment in a content item based on ambient audio data that includes a portion of the content item. The system 200 includes a computing device 202, a speaker identification engine front-end 210, a content recognition engine 220, a speaker identification engine 230, and a speaker knowledge base 240.

In more detail, the computing device 202 is in communication with the speaker identification engine front-end 210 over one or more networks. The computing device 202 can include a microphone, a camera, or other detection mechanism for detecting inputs from a user 204, such as spoken utterances requesting identification of a speaker at a particular moment in a content item, and/or ambient audio data associated with the environment of the user 204. Ambient audio data can include background noise detected in the environment of the user 204 by the computing device 202 that includes the audio of a content item, e.g., by using a microphone of the computing device 202. In some embodiments, the computing device 202 is a mobile computing device, such as a mobile phone, smart phone, personal digital assistant (PDA), music player, e-book reader, tablet computer, laptop computer, or other portable device.

The speaker identification engine front-end 210 receives data encoding user inputs and ambient audio data, processes the data to identify user-input commands, and executes operations related to performing large-scale speaker identification. The content recognition engine 220 recognizes particular content items, e.g., by identifying the title of a movie, television show, audio book, etc., and timestamps identifying particular segments of recognized content items, based on ambient audio data that contains at least a portion of the content item.

The speaker identification engine 230 identifies an active speaker associated with a particular moment in a content item based on information identifying the content item and a timestamp indicating the particular moment in the content item that is of interest. The speaker knowledge base 240 identifies additional information relating to an identified speaker and/or a recognized content item, e.g., personal information relating to the identified speaker, information about a character that the identified speaker plays in the recognized content item, or information relating to the recognized content item. In practice, each of the speaker identification engine front-end 210, the content recognition engine 220, the speaker identification engine 230, and the speaker knowledge base 240 can be in communication with one another over one or more networks, or can be in communication with a subset of one another over one or more networks.

In some examples, a user 204 is watching a movie. In the illustrated example shown in FIG. 2, the user 204 would like to know who a speaker is during a particular moment in the movie. If the user 204 does not know the identity of the speaker at the particular moment in the movie, the user 204 can say, "Who is this person speaking," with the intent that the computing device 202 will identify this phrase as a voice command to identify the person speaking at the particular moment in the movie, i.e., to identify an actor, actress, or other individual that is speaking at the particular moment in the movie. The computing device 202 detects the utterance corresponding to the voice command, as well as ambient audio data associated with the environment of the user 204.

In some examples, the ambient audio data associated with the environment of the user 204 includes background noise of the environment of the user 204. For example, the ambient audio data can include the sounds of the movie. In some examples, the sounds of the movie can include audio of the movie, e.g., dialogue of the movie, a soundtrack of the movie, special effects sounds of the movie, etc.

In some embodiments, the computing device 202 detects the ambient audio data after detecting the spoken utterance associated with the voice command input by the user 204, e.g., after the user says, "Who is this person speaking?" For example, in some implementations, the computing device 202 can detect the spoken utterance associated with the voice command, can transmit data associated with the spoken utterance to the speaker identification engine 210, and can receive an indication from the speaker identification engine 210 identifying the spoken utterance as a voice command to perform large-scale speaker identification. The computing device 202 can detect ambient audio data based on receiving the indication that the spoken utterance is associated with a voice command to perform large-scale speaker identification using ambient audio. In other examples, the computing device 202 can detect ambient audio data concurrently with the spoken utterance, and/or detects ambient audio data prior to detecting the spoken utterance.

The computing device 202 processes the detected utterance and the ambient audio data to generate waveform data 250, and transmits the waveform data 250 to the speaker identification engine front-end 210 at operation (A). In some implementations, the waveform data 250 represents both the detected utterance correlating to the voice command and the ambient audio data, i.e., in a single waveform. In some embodiments, the ambient audio data is streamed from the computing device 202 to the speaker identification engine front-end 210.

The speaker identification engine front-end 210 receives the waveform data 250 from the computing device 202. The speaker identification engine front-end 210 identifies a voice command to perform by processing the waveform data 250. In some embodiments, the speaker identification engine front-end 210 processes the waveform data 250 by separating and/or extracting the user-input utterance from other portions of the waveform data 130 and analyzing the spoken utterance to identify a voice command corresponding to the utterance.

For example, the speaker identification engine front-end 210 can extract the spoken utterance from the waveform data 250 using a voice activity detector, and a transcription of the spoken utterance can be generated by using speech recognition. The transcription of the utterance can be analyzed to identify a voice command associated with the transcription of the utterance. For example, a spoken utterance can be transcribed to obtain the transcription, "Who is this person speaking," and the voice command to perform large-scale speaker identification on ambient audio data can be identified based on the transcription of the utterance.

Based on determining that the spoken utterance corresponds to a voice command to perform large-scale speaker identification, the voice identification engine front-end 210 can process the waveform data 250 by separating and/or extracting the ambient audio data from the waveform data 250, and transmitting the ambient audio data to the content recognition engine 220 during operation (B). For example, the voice identification engine front-end 210 transmits ambient audio data from the environment of the user 204 to the content recognition engine 220, where the ambient audio data includes audio of the movie that the user 204 is watching, e.g., dialogue of the movie, the soundtrack of the movie, special effects sounds of the movie, etc.

In some embodiments, data encoding a first waveform corresponding to a spoken utterance input by a user 204 can be received and identified as a request to perform large-scale speaker identification by the speaker identification engine front-end 210, and based on the determination that the user input is a request to perform large-scale speaker identification, data encoding a second waveform corresponding to ambient audio from the environment of the user can be received at the speaker identification engine front-end 210. For example, the speaker identification engine front-end 210 can determine that a first waveform corresponding to a user-input utterance identifies a request to perform large-scale speaker identification, and in response to determining that the spoken utterance corresponds to the request to perform large-scale speaker identification, the speaker identification engine front-end 210 can communicate with the computing device 202 to obtain second waveform data corresponding to ambient audio from the environment of the user. The speaker identification engine front-end 210 can then provide the second waveform data comprising ambient audio from the environment of the user to the content recognition engine 220 during operation (B).

In some embodiments, the voice identification engine front-end 210 provides a portion of ambient audio data to the content recognition engine 220. In some examples, the ambient audio data provided to the content recognition engine 220 can include background noise detected by the computing device 202 after detecting the user-input utterance, concurrently with detecting the user-input utterance, or prior to detecting the input of the utterance.

The content recognition engine 220 receives the ambient audio data from the speaker identification engine front-end 210, and processes the ambient audio data to recognize the content associated with the ambient audio data. The content recognition engine 220 can recognize a content item based on, for example, dialogue of the movie, a soundtrack of the movie, special effects sounds of the movie, etc., that are contained within the ambient audio data. In some instances, the method used to recognize the content item depends on the portion of the content item's audio that is included in the ambient audio data received at the content recognition engine 220, e.g., depending on whether the ambient audio data contains dialogue, a portion of a soundtrack, or special effects sounds of the content item.

In some implementations, the content recognition engine 220 is an audio fingerprinting engine that utilizes content fingerprinting using wavelets to recognize the content item. Specifically, the content recognition engine 220 converts the ambient audio data of the waveform data 250 into a spectrogram. From the spectrogram, the content recognition engine 220 extracts spectral images. The spectral images can be represented as wavelets. For each of the spectral images that are extracted from the spectrogram, the content recognition engine 220 extracts the "top" wavelets based on the respective magnitudes of the wavelets. For each spectral image, the content recognition engine 220 computes a wavelet signature of the image. In some examples, the wavelet signature is a truncated, quantized version of the wavelet decomposition of the image.

For example, to describe an m×n image with wavelets, m×n wavelets are returned without compression. Additionally, the content recognition engine 108 utilizes a subset of the wavelets that most characterize the song. Specifically, the t "top" wavelets (by magnitude) are selected, where t<<m×n. Furthermore, the content recognition engine 220 creates a compact representation of the sparse wavelet-vector described above, for example, using MinHash to compute sub-fingerprints for these sparse bit vectors.

In addition to determining the identity of the content item, the content recognition engine 220 identifies a timestamp associated with a particular segment of the content item. In some instances, the identified timestamp corresponds to the segment of the content item that is contained in the ambient audio data. In some examples, a timestamp can be a counter value, i.e., an indication of a particular time in the movie.

In some embodiments, a timestamp can be an alphanumeric code that uniquely identifies a particular segment in a particular content item. For example, the content recognition engine 220 can determine that the phrase, "Here's looking at you, kid," corresponds to a particular segment of a particular version of the movie "Casablanca," and can identify a particular alphanumeric timestamp in response to determining that the phrase, "Here's looking at you, kid," corresponds to the particular segment of "Casablanca." In such an embodiment, the alphanumeric code can be unique to both the segment of the content item and the content item. For example, the alphanumeric code corresponding to a particular time point in the movie "Casablanca," e.g., 1:10:05 in "hours:minutes:seconds" format, can be different from an alphanumeric code corresponding to the same time point in the movie "To Have and Have Not," e.g., the alphanumeric code associated with the time 1:10:05 in "To Have and Have Not."

In some embodiments, a timestamp can be a representation of a time counter, where the timestamp is not unique to a particular content item. For example, a particular timestamp can be identified based on determining that the phrase, "Here's looking at you, kid," occurs at a particular time in the movie "Casablanca," and the same timestamp can be identified based on determining that another sample of ambient audio data corresponds to the same time in the movie "To Have and Have Not." The data identifying the content item can then be used to determine the particular content item relating to the timestamp.

In some embodiments, identifying a content item and a corresponding timestamp can be achieved by comparing the ambient audio data to the audio data of the content items stored in a prerecorded content database 224. For example, the prerecorded content database 224 can contain a corpus of prerecorded content items that have been preprocessed, and the content recognition engine 220 can recognize a content item and identify a timestamp by comparing the ambient audio data to the content items in the prerecorded content database 224.

In some implementations, the prerecorded content database 224 includes preprocessed versions of various content items, e.g., preprocessed versions of a multitude of movies, television shows, news broadcasts, sporting events, audio books, and/or other content. Content items and metadata associated with the content items can be preprocessed in bulk and the processed content data stored in the prerecorded content database 224. In some embodiments, the processed content data can include audio fingerprints of the content items, where the audio fingerprints can be indexed and used to recognize a content item from ambient audio data by matching the audio fingerprints of the ambient audio data to the audio fingerprints of a particular content item. In some embodiments, the processed content data also includes timestamps corresponding to segments of the various content items, and identifying a timestamp based on ambient audio data can involve identifying a timestamp based on determining that the ambient audio data relates to a particular timestamped segment of a content item.

In some instances, as mentioned, the timestamp that is identified based on the ambient audio data can be the timestamp corresponding to the portion of the recognized content item that is contained in the ambient audio data. For example, the ambient audio data can include the portion of the movie "Casablanca" that features the phrase, "Here's looking at you, kid," and the identified timestamp can be the timestamp that corresponds to the segment of the movie "Casablanca" that features the phrase, "Here's looking at you, kid."

In other instances, the timestamp that is identified based on the ambient audio data can be associated with a segment of the recognized content item that is different from the segment of the content item that is contained in the ambient audio data. For example, ambient audio data received at the content recognition engine 220 can include audio of the movie "Casablanca" that is shortly after the segment of the movie that contains the phrase, "Here's looking at you, kid," and the timestamp identified for the portion of ambient audio data can be the timestamp associated with the segment of the movie that contains the phrase, "Here's looking at you, kid." In some embodiments, the identified timestamp can be a timestamp associated with a segment of the recognized content that occurs prior to, concurrent with, or after the segment of the content item that is contained in the ambient audio data.

In some instances, identifying a timestamp corresponding to a segment of a recognized content item that is different from the portion of the content item contained in the ambient audio data can enable the system to better address a user's intent. For example, a delay can exist between when a user 204 hears the phrase, "Here's looking at you, kid," in the movie "Casablanca" and when the user says, "Who is this person speaking," at the computing device 202. Based on identifying that the user 204 most likely wants to know the identity of the speaker who said, "Here's looking at you, kid," a timestamp can be identified that is associated with the segment of the movie that features the phrase, "Here's look-ing at you, kid," rather than identify the timestamp corresponding to the segment of the movie that is contained in the ambient audio data.

Based on recognizing the content item and a timestamp identifying a particular segment of the recognized content item, the content recognition engine 220 transmits data identifying the content and the timestamp to the speaker identification engine front-end 210 during operation (C). For example, the content recognition engine 220 can transmit data identifying the content item as the movie, "Casablanca," and can furthermore transmit data identifying a timestamp corresponding to the segment of the movie that features the phrase, "Here's looking at you, kid."

The speaker identification engine front-end 210 transmits data identifying the content item and the timestamp to the speaker identification engine 230 at operation (D). For example, the speaker identification engine front-end 210 can transmit data identifying the content as the movie "Casablanca" and data identifying a timestamp corresponding to the segment of the movie "Casablanca" that features the phrase, "Here's looking at you, kid."

The speaker identification engine 230 can receive the data identifying the content item and the timestamp and can use the content identity and the timestamp to identify a speaker associated with the segment of the recognized content item corresponding to the timestamp. For example, the speaker identification engine 230 can access a content-speaker database 234 and can identify a speaker associated with the timestamped segment of the recognized content based on information accessed at the content-speaker database 234.

In some embodiments, the content-speaker database 234 contains information identifying the active speaker for each timestamped segment of the various content items maintained at the prerecorded content database 224. For example, the content-speaker database 234 can contain a database entry for each content item, e.g., each movie, television show, news broadcast, sporting event, audio book, or other content item, along with entries identifying the active speaker for each timestamped segment of each content item.

In some implementations, the information maintained at the speaker identification engine 230 is generated by preprocessing the various content items. For instance, the various content items can be preprocessed to obtain data identifying an active speaker for each timestamped segment of each content item that features active speech. For example, prerecorded versions of each of the content items can be batch processed to identify a primary speaker for each timestamped segment of each content item. Batch processing the content items can involve obtaining full versions of the content items as well as metadata that contains cast lists for the content items, e.g., a cast list for a movie or television show, a list of anchors, analysts, and reporters for a news or sporting event broadcast, a reader list for an audio book, etc. Preprocessing a full version of a content item can involve generating a file or record containing a list of the timestamped segments of the content item along with a name or other identification of the active speaker, if such a speaker exists, for each of the timestamped segments. In some examples, only a portion of the timestamped segments of a content item are assigned an active speaker, based on some of the timestamped segments being segments in which none of the cast of speakers are speaking. For example, a segment of a movie that features only special effects noises will not be associated with an active speaker. In such an instance, the timestamped segment can be identified as not having an active speaker, or the entry at the content-speaker database 234 corresponding to that timestamp can be removed from the content-speaker database 234.

In some instances, identifying the active speaker for a particular timestamped segment of content can involve using a model trained on a set of utterances for each known speaker in the content-speaker database 234. In such an embodiment, identifying an active speaker for a timestamped segment of content can involve a two-step process. First, the version of the content item to be preprocessed is segmented, i.e., the audio data of the content item is segmented into discrete portions. Second, a trained model for each known speaker in the cast list is obtained and, for each segment of the content item, a classification is performed that uses the trained models to identify the active speaker in that segment. Based on determining that a segment corresponds to a particular speaker, the segment can be assigned a speaker label that identifies the active speaker for that segment. For example, in preprocessing the movie "Casablanca," the segment that features the phrase, "Here's looking at you, kid," is assigned a label identifying the actor "Humphrey Bogart" as the active speaker.

In some embodiments, classifying a segment using the trained models includes evaluating the segment using each of the trained models and assigning a confidence score to each of the trained models based on the extent to which the segment correlates with that model. For example, the segment of the movie "Casablanca" containing the phrase, "Here's looking at you, kid," can be compared to trained models associated with each of the cast members, e.g., a trained model for each of the cast members "Humphrey Bogart," "Ingrid Bergman," etc., and a confidence score can be assigned to each model.

The active speaker for the timestamped segment can be identified based on the confidence scores assigned to each of the trained models. In some instances, the active speaker is identified as the speaker associated with the trained model that was assigned the highest confidence score. For example, all of the trained models for the speakers in the movie "Casablanca" can be assigned a score relating to the segment of the movie that features the phrase, "Here's looking at you, kid," and the actor "Humphrey Bogart" can be identified as the speaker corresponding to the particular segment based on the trained model associated with the actor "Humphrey Bogart" being assigned the highest confidence score among the trained models. In other implementations, higher confidence is reflected by lower confidence scores, and the active speaker can be identified as the speaker associated with the lowest confidence score. In some instances, other evaluations can be used to determine the active speaker for the timestamped segment.

Based on receiving information identifying the content item and a timestamp associated with the content item, the speaker identification engine 230 can identify an active speaker for the particular segment of the recognized content item associated with the received timestamp, and can transmit data identifying the speaker to the speaker identification engine front-end 210 at operation (E). For example, based on receiving data identifying the content item as the movie "Casablanca" and a particular timestamp that corresponds to the segment of the movie that features the phrase, "Here's looking at you, kid," the speaker identification engine 230 can access the speaker identification database 234, can identify the speaker associated with the particular timestamp of the movie "Casablanca" as the actor "Humphrey Bogart," and can transmit data identifying the speaker "Humphrey Bogart," to the speaker identification engine front-end 210.

The speaker identification engine front-end 210 receives the data identifying the speaker from the speaker identification engine 230. For example, the speaker identification engine front-end 210 can receive data from the speaker identification engine 230 identifying a speaker as the actor "Humphrey Bogart." In some instances, the data identifying the speaker can be associated with the data received from the content recognition engine 220 identifying the content as the movie "Casablanca" and identifying the timestamp corresponding to the segment of the movie that features the phrase, "Here's looking at you, kid."

The speaker identification engine front-end 210 can transmit data identifying the speaker to the speaker knowledge base 240 at operation (F). For example, the speaker identification engine front-end 210 can transmit data identifying the actor "Humphrey Bogart," to the speaker knowledge base 240.

In some implementations, the speaker identification engine front-end 210 can transmit additional information to the speaker knowledge base 240, for example, information indicating the recognized content item and/or information identifying the timestamped segment of the recognized content. For example, in addition to transmitting information indicating that the identified speaker is the actor "Humphrey Bogart," the speaker identification engine front-end 210 can also transmit an indication to the speaker knowledge base 240 indicating that the recognized content item is the movie "Casablanca," and/or can transmit information indicating that the identified segment of the content item is the segment of the movie that features the phrase, "Here's looking at you, kid."

The speaker knowledge base 240 can receive the data identifying the speaker, and can access information relating to the identified speaker. For example, the speaker knowledge base 240 can receive information identifying the speaker as the actor "Humphrey Bogart," and can access information relating to the actor "Humphrey Bogart." In some instances, the speaker knowledge base 240 maintains information relating to each of the speakers for which there is a trained model, for example, for all speakers included in the cast lists of the multitude of content items maintained at the content recognition engine 220 and/or the speaker identification engine 230.

In some instances, the information accessed at the speaker knowledge base 240 can be personal information relating to the identified speaker. For example, the information accessed at the speaker knowledge base 240 can include a filmography of the actor "Humphrey Bogart," a brief biography of the actor "Humphrey Bogart," images of the actor "Humphrey Bogart," or other information relating to the actor "Humphrey Bogart."

In some implementations, the information accessed at the speaker knowledge base 240 can also include information relating to the recognized content item and/or information relating to the timestamped segment of the recognized content item. For example, in addition to accessing information relating to the actor "Humphrey Bogart," the speaker knowledge base 240 can also access information relating to the movie "Casablanca," e.g., information indicating the year the movie was released, the director of the movie, awards bestowed on the movie, a plot summary of the movie, etc., and/or information relating to the segment of the movie featuring the phrase, "Here's looking at you, kid," e.g., a screenshot of the scene, critics' interpretations of the scene, other characters featured in the scene, etc.

Based on identifying the information relating to the identified speaker, the speaker knowledge base 240 transmits the accessed information to the speaker identification engine front-end 210 at operation (G).

The speaker identification engine front-end 210 can receive the speaker information from the speaker knowledge base 240. For example, the speaker identification engine front-end 210 can receive information relating to the actor "Humphrey Bogart" at the speaker identification engine front-end 210.

Based on receiving speaker information from the speaker knowledge base 240, the speaker identification engine front-end 210 can transmit content item data to the computing device 202 at operation (G). In some instances, the content item data transmitted to the computing device 202 can include one or more of: the identity of the content item, an indication of a point in time of the content item to which the identified timestamp corresponds, the identity of the active speaker relating to the identified timestamp of the recognized content item, information relating to the identified speaker, information relating to the recognized content, and/or information relating to the identified segment of the recognized content. For example, the content item data can include an indication that the recognized content is the movie "Casablanca" and can further indicate that the active speaker corresponding to the identified segment of the content item is the actor "Humphrey Bogart," who is playing the character "Rick Blaine," as shown in FIG. 2.

Based on receiving the content item data, the computing device 202 can output the content item data to the user 204. For example, the computing device 202 can output a display 206 similar to that shown in FIG. 2 indicating that the content the user 204 is watching is the movie "Casablanca," and that the scene for which the user 204 requested information is the scene featuring the character "Rick Blaine" played by the actor "Humphrey Bogart."

Figure 3:
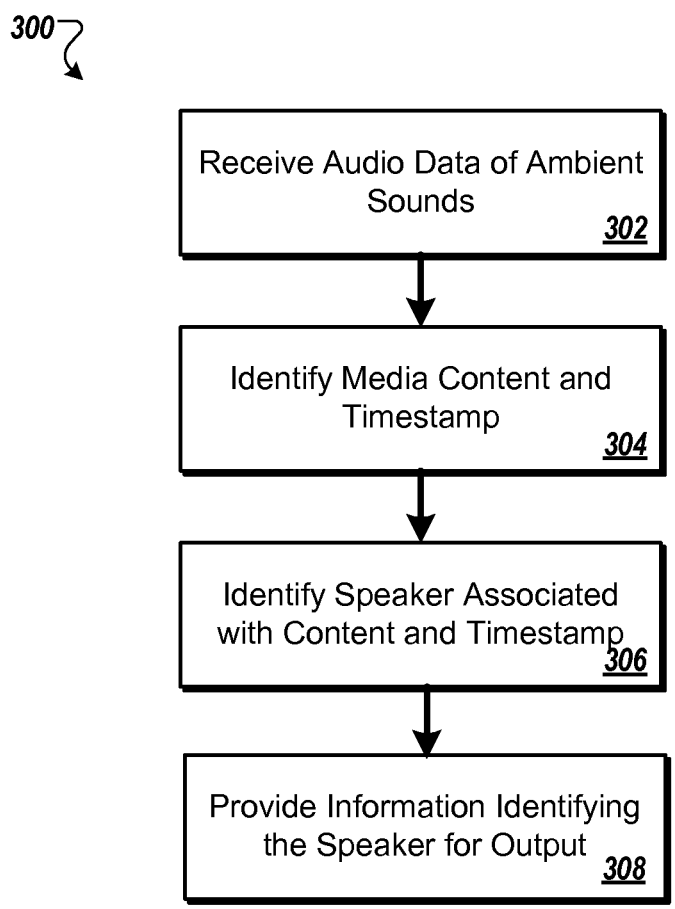
FIG. 3 is a flow chart of an example process for performing large-scale speaker identification.

FIG. 3 depicts a flowchart of an example process 300 for performing large-scale speaker identification based on a user-input command and ambient audio data. The example process 300 can be executed using one or more computing devices. For example, the example process 300 can be executed by the computing device 202, the speaker identification engine front-end 210, the content recognition engine 220, the speaker identification engine 230, and/or the speaker knowledge base 240.

Data encoding ambient audio from the environment of a user is received (302). For example, the speaker identification engine front-end 210 can receive waveform data 250 that encodes ambient audio data as well as a user-input utterance corresponding to a voice command. In some instances, the ambient audio data can be received from a user's computing device and can include partial audio of a content item, such as audio from a particular movie, television show, news broadcast, sporting event broadcast, audio book, or other content item that contains audio and one or more speakers. In some embodiments, a content item can also be content that has a vocalist in addition to or instead of a speaker. For example, a content item can be a song, musical, opera, music video, etc.

In some instances, receiving audio data encoding ambient audio from the environment of the user can include receiving waveform data such as waveform data 250 and separating and/or extracting the ambient audio data from the waveform data. For example, the waveform data can include both ambient audio data and audio data corresponding to a spoken utterance input by a user, and the ambient audio data can be separated from the audio data corresponding to the spoken utterance. In some examples, the audio data corresponding to the spoken utterance can be separated and/or extracted from the waveform data, for example, using a voice activity detector, and the portion of the waveform data not identified as audio data corresponding to the spoken utterance can be identified as ambient audio data.

A content item and timestamp can be identified based on the ambient audio data (304). For example, the speaker identification engine front-end 210 can transmit the ambient audio data to the content recognition engine 220 and the content recognition engine 220 can recognize a content item associated with the ambient audio data as well as identify a timestamp corresponding to a segment, i.e., a particular point in time, of the recognized content item.

In some instances, identifying a content item based on ambient audio data can be achieved by using content fingerprinting using wavelets to recognize the content item. Specifically, the portion of the waveform data corresponding to the ambient audio data can be converted into a spectrogram. Spectral images can then be extracted from the spectrogram. The spectral images can be represented as wavelets. For each of the spectral images that are extracted from the spectrogram, the "top" wavelets can be extracted based on the respective magnitudes of the wavelets. For each spectral image, a wavelet signature of the spectral image can be computed. In some examples, the wavelet signature is a truncated, quantized version of the wavelet decomposition of the image.

For example, to describe an m×n image of the wavelets, m×n wavelets are returned without compression. Additionally, a subset of the wavelets that most characterizes the song can be used. Specifically, the t "top" wavelets, by magnitude, are selected, where t<<m×n. Furthermore, a compact representation of the sparse wavelet-vector described above is created, for example, using MinHash to compute sub-fingerprints for these spare bit vectors.

In some implementations, a content item can be identified by comparing audio fingerprints of the ambient audio data to the audio fingerprints of preprocessed content items. For example, the content recognition engine 220 can maintain a database of prerecorded content that has been preprocessed, where preprocessing the content items can include obtaining audio fingerprints of the content items. Based on receiving and fingerprinting the ambient audio data, the content item can be identified by comparing the fingerprints of the ambient audio data to the fingerprints of the preprocessed content items to determine a content item to which the ambient audio data corresponds.

In some instances, the fingerprints of the ambient audio data sample are compared to the fingerprints of the preprocessed content items, and a confidence score is generated for one or more of the content items that indicates an estimated likelihood that the ambient audio data corresponds to the particular content item. For example, fingerprints of the ambient audio data can be compared to fingerprints of the preprocessed content items, and two or more content items can be identified whose fingerprints, or a portion of whose fingerprints, match those of the ambient audio data, each with varying degrees of accuracy. Each of the two or more content items can be assigned confidence score values based on the extent to which the audio fingerprints of the ambient audio data match the fingerprints of the content item. A particular content item can then be identified as corresponding to the ambient audio data, based on the confidence scores. For example, the content item with the highest confidence score can be selected as corresponding to the ambient audio data. In other implementations, high confidence can be reflected in low confidence scores, and the content item with the lowest score can be selected as corresponding to the ambient audio data. In some instances, other evaluations can be used to determine the content item corresponding to the ambient audio data.

In some embodiments, a confidence score threshold must be satisfied before the content item can be identified as matching, or as a potential match to, the ambient audio data. For example, a confidence score threshold can be established or predetermined, and based on a confidence score associated with a content item satisfying the threshold, the content item can be identified as a potential match with the ambient audio data, i.e., the ambient audio data can be identified as potentially corresponding to the particular content item. If the confidence score associated with more than one content item satisfies the threshold, the content item having the score indicating the most confidence can be identified as corresponding to the ambient audio data.

In addition to identifying a content item associated with the ambient audio data, a timestamp is identified that indicates a particular segment of the recognized content item, i.e., a particular point in time of the content item. For example, an identified timestamp can correspond to the point in time of the recognized content item to which the ambient audio data corresponds. In some instances, identifying a particular timestamp can include comparing the fingerprints of the ambient audio data to the fingerprints of preprocessed content items maintained at a database, where the preprocessed content item fingerprints can be associated with timestamps. Based on determining that the ambient audio data corresponds to a particular content item, a timestamp can be identified by determining which of the content's timestamped fingerprints match those of the ambient audio data.

In some embodiments, an identified timestamp can correspond to a segment of a content item that is different from the segment of the content item associated with the ambient audio data. For example, an ambient audio data sample can correspond to a particular portion of a content item, and the identified timestamp associated with the ambient audio data can be a timestamp associated with a portion of the content item that is different from the portion of the content item contained in the ambient audio data.

In some instances, identifying a timestamp that corresponds to a segment of the recognized content that is different from the segment of the content contained in the ambient audio data can enable the system to better address the intent of a user. For example, a delay can exist between when a user hears a phrase in a content item for which they want to identify a speaker, and when the user inputs a voice command requesting to identify the speaker.

For example, a user might hear the phrase, "Here's looking at you, kid," and a delay may exist between when the user hears the phrase and when the user is able to input the voice command, "Who is this person speaking?" In such an instance, the system can recognize the content based on ambient audio data received subsequent to, concurrent with, the user-input voice command, and can also identify a segment of the recognized content to which the ambient audio data corresponds. The system can then identify a timestamp corresponding to a segment of the recognized content that precedes the segment of the recognized content to which the ambient audio data corresponds, to compensate for the delay between the user hearing the phrase, "Here's looking at you, kid," and the user inputting the voice command, "Who is this person speaking?"

In some embodiments, a timestamp that corresponds to a segment of the recognized content that is different from the segment of the content contained in the ambient audio data can be identified, based on determining that the segment of the content corresponding to the ambient audio data does not feature an active speaker. For example, a user can input a voice command requesting to identify a speaker in a content item, where the ambient audio data used to recognize the content does not feature an active speaker. In such an instance, the system can recognize the content item based on the ambient audio data, and can identify a timestamp associated with a segment of the recognized content item that is different from the segment of the content contained in the ambient audio data.

In some instances, the identified timestamp is the timestamp associated with the segment of the content item that is the closest in time to the segment of the content item to which the ambient audio data corresponds and which contains an active speaker. For example, ambient audio data can be used to recognize a content item and identify a segment of the content item to which the ambient audio data corresponds. Based on determining that the segment of the content item associated with the ambient audio data does not contain an active speaker, a timestamp can be identified that is associated with the segment of the content item that is the nearest in time to the segment corresponding to the ambient audio data and that features an active speaker.

In other embodiments, the identified timestamp is the timestamp associated with the segment of the content item that is the closest prior, or subsequent, segment of the content item that features an active speaker, relative to the segment of the content item contained in the ambient audio data. For example, ambient audio data can be used to recognize a content item and identify a segment of the content item to which the ambient audio data corresponds. Based on determining that the segment of the content item associated with the ambient audio data does not contain an active speaker, a timestamp can be identified that is associated with the segment of the content item that is the closest prior, or subsequent, segment of the content item that features an active speaker.

A speaker can be identified that is associated with the recognized content item and timestamp (306). For example, based on identifying a particular content item and a timestamp indicating a particular segment of the content item, the active speaker associated with the identified segment of the content item can be identified. In some examples, the content recognition engine 220 transmits data identifying the content and a timestamp to the speaker identification engine front-end 210. The speaker identification engine front-end 210 can then transmit the data identifying the content item and the timestamp to the speaker identification engine 230, where the speaker identification engine 230 can identify an active speaker associated with the timestamped segment of the content item.

In some embodiments, identifying a speaker based on data identifying a content item and a timestamp can involve accessing a database that contains information identifying an active speaker for each timestamp of each preprocessed content item that features an active speaker. For example, the database can contain an entry for each timestamped segment of each preprocessed content item that has an active speaker, and the entry can identify the active speaker associated with that timestamped segment.

Based on receiving data identifying the content item and the timestamp, for example, at the speaker identification engine 230, an active speaker can be identified by accessing the entry of the database associated with the particular timestamped segment of the content item and identifying the active speaker for that particular timestamped segment. For example, the database can have an entry associated with the timestamped segment of the movie "Casablanca" corresponding to the scene that features the phrase, "Here's looking at you, kid," and the entry can indicate that the active speaker associated with that segment is the actor "Humphrey Bogart." Based on receiving data identifying a content item as the movie "Casablanca," and a timestamp that is associated with the segment of the movie that features the phrase, "Here's looking at you, kid," the active speaker for the segment is identified as the actor "Humphrey Bogart."

In some instances, the speaker information maintained at the database is generated by preprocessing content items to obtain data identifying an active speaker for each timestamped segment of a content item, or for those timestamped segments that have an active speaker. In some embodiments, preprocessing a content item is achieved by first obtaining a prerecorded version of the content item, along with metadata that contains a list of speakers in the content item.

For each speaker identified in at least one speaker list maintained at the database, a trained model for the speaker is obtained. For example, a model can be an acoustic model trained on a set of known utterances for the speaker. In some instances, the model can be trained using Gaussian mixture models (GMM), in which speaker-dependent spectral shapes can effectively model a speaker's identity. In other implementations, a model can be trained using long-term averages of acoustic features for the speaker, such as phonetic variations, can be trained using a discriminative neural network approach, or can be trained using any other speaker identification or modeling approach. In some instances, the speaker models can be accessed over one or more networks, or can be generated and stored locally at the database.

Using the trained speaker models, a content item can be processed to identify an active speaker for each timestamped segment of the content that features speech. In some instances, processing a content item involves a two-step process. The content item is first segmented, for example, into segments that can be timestamped. In some instances, segmenting the content item can involve segmenting the audio of the content using a process based on the Bayesian Information Criterion (BIC). In other implementations, segmenting the content item can involve segmenting the audio of the content item using a classifier method, or other segmentation method.

After segmenting the content item, a trained model associated with each of the speakers indicated in the content item metadata can be loaded, and each segment of the content that features speech can be classified as featuring one of the speakers. For example, each segment of the content item can be associated with a single active speaker, where each segment can be classified as featuring a certain speaker by comparing the segment of the content's audio to the trained model for each speaker listed in the content's speaker list.

For example, the audio of the segment of the movie "Casablanca" that features the phrase, "Here's looking at you, kid," can be compared to the trained models for all of the speakers indicated in the movie's cast list, e.g., "Humphrey Bogart," "Ingrid Bergman," "Peter Lorre," etc., and the segment can be classified as featuring the active speaker "Humphrey Bogart" based on determining that the segment best matches the trained model associated with the actor "Humphrey Bogart."

In some implementations, data identifying the active speakers associated with timestamped segments of content items is maintained at the same database as the database containing the fingerprints of the content items and the timestamps associated with those fingerprints. For example, the database accessed by the content recognition engine 220 and the database accessed by the speaker identification engine 230 can be the same database. In some embodiments, the data maintained at the database can be stored in a tabular format, e.g., a look-up table, and each timestamped segment of a content item, along with data identifying its fingerprint and active speaker, can be stored as a single entry in the database. In other embodiments, the fingerprint, timestamp, and active speaker data for a particular segment of a content item can be stored as separate entries in the database, or can be stored in another manner.

As described, based on identifying a content item and a timestamp of the content item, an active speaker for the segment can be identified by accessing the database of preprocessed content items and identifying a speaker for the particular segment of the content item. For example, based on identifying that the content contained in ambient audio data is the movie "Casablanca" and based on identifying a timestamp associated with the segment of the movie that features the phrase, "Here's looking at you, kid," the actor "Humphrey Bogart" can be identified as the active speaker by accessing an entry in the database corresponding to the identified timestamp of the movie "Casablanca."

Information identifying the speaker is provided for output to the user (308). For example, the speaker identification engine 230 can transmit data identifying the speaker to the speaker identification engine front-end 210. The speaker identification engine front-end 210 can then provide information identifying the speaker to the speaker knowledge base 240 and the speaker knowledge base 240 can return information relating to the identified speaker for output to the user.

In some implementations, providing information for output to a user can include providing information relating to the particular speaker, information relating to a specific character that the speaker is playing in a content item, e.g., a character that an actor is playing in a movie, information relating to the recognized content item, information relating to other speakers in the content item, information relating to the subject of the recognized content item, e.g., other reports relating to a subject of a news broadcast, information relating to a historical event on which a movie or television show is based, etc. In some examples, providing additional information comprises providing information relating to the recognized content item to the speaker knowledge base 240 in addition to data identifying the speaker. For example, the speaker identification engine front-end 210 can transmit data identifying an active speaker, the content item, and/or the timestamp to the speaker knowledge base 240, where the information can be used to access and provide additional information for output to a user.

In some instances, the information provided for output is accessed at a database that maintains information relevant to the preprocessed content items. In other implementations, the information can be accessed over one or more networks, for example, by performing a query on the database over one or more networks, or by performing a query at a search engine, and providing the results of the query for output to a user.

Based on accessing information identifying the speaker, or other relevant information, the accessed information can be output to a user over one or more networks. For example, the speaker knowledge base 240 can access the information and can transmit the information to the speaker identification engine front-end 210. The speaker identification engine front-end 210 can then output the information to a user, for example, by outputting the information to a computing device 202 associated with the user. The computing device 202 can provide the information to the user, for example, by displaying the information on a display 206 of the computing device 202.

For example, based on information identifying the content item as the movie "Casablanca," and based on determining that the active speaker associated with the segment of the movie featuring the phrase, "Here's looking at you, kid," is the actor, "Humphrey Bogart," information can be identified and provided for output to the user. For example, the information provided to the user can indicate that the user is watching the movie "Casablanca," and that the speaker associated with the segment of the content featuring the phrase, "Here's looking at you, kid," is the actor "Humphrey Bogart" playing the character "Rick Blaine."

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

For instances in which the systems and/or methods discussed here may collect personal information about users, or may make use of personal information, the users may be provided with an opportunity to control whether programs or features collect personal information, e.g., information about a user's social network, social actions or activities, profession, preferences, or current location, or to control whether and/or how the system and/or methods can perform operations more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained, such as to a city, ZIP code, or state level, so that a particular location of a user cannot be determined. Thus, the user may have control over how information is collected about him or her and used.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments have been described. Other embodiments are within the scope of the following claims. For example, the actions recited in the claims may be performed in a different order and still achieve desirable results.

What is claimed is:

1. A computer-implemented method comprising:
    receiving (i) a request to identify a speaker, and (ii) an audio data representation of ambient sounds;
    transmitting, to a content recognition engine, a request to identify an item of media content that is associated with the ambient sounds;
    obtaining, from the content recognition engine, a response to the request to identify an item of media content that is associated with the ambient sounds, wherein the response includes (i) data identifying a particular item of media content that the content recognition engine has associated with the ambient sounds, and (ii) a timestamp associated with a portion of the particular item of media content that the content recognition engine has associated with the ambient sounds, and wherein the response to the request to identify an item of media content that is associated with the ambient sounds does not identify any speaker;
    transmitting, to a speaker identification engine, a request to identify a speaker that is associated with the portion of the particular item of media content that is associated with the timestamp;
    obtaining, from the speaker identification engine, a response to the request to identify a speaker that is associated with the portion of the particular item of media content that is associated with the timestamp, wherein the response identifies a particular speaker that the speaker identification engine has associated with the portion of the particular item of media content that is associated with the timestamp; and
    providing, for output, information identifying the particular speaker that the speaker identification engine has associated with the portion of the particular item of media content that is associated with the timestamp.

2. The method of claim 1, wherein receiving the audio data representation of the ambient sounds comprises:
    receiving a request to identify a speaker whose voice is included among the ambient sounds; and
    receiving the audio data representation of the ambient sounds based on receiving the request to identify the speaker whose voice is included among the ambient sounds.

3. The method of claim 2, wherein receiving the request to identify the speaker whose voice is included among the ambient sounds comprises detecting a spoken utterance input by a user.

4. The method of claim 2, wherein receiving the request to identify the speaker whose voice is included among the ambient sounds comprises detecting a user selection of a control.

5. The method of claim 1, wherein obtaining the response to the request to identify an item of media content that is associated with the ambient sounds, wherein the response includes the timestamp associated with the portion of the particular item of media content that the content recognition engine has associated with the ambient sounds comprises:
    obtaining one or more audio fingerprints of the audio data representation of the ambient sounds;
    comparing one or more of the audio fingerprints of the audio data representation of the ambient sounds to one or more audio fingerprints of prerecorded versions of items of media content;
    identifying the particular item of media content that the content recognition engine has associated with the ambient sounds based on determining that one or more of the audio fingerprints of the audio data representation of the ambient sounds match one or more audio fingerprints of the particular item of media content; and
    identifying, as the timestamp associated with the portion of the particular item of media content that the content recognition engine has associated with the ambient sounds, a particular timestamp associated with at least one of the one or more audio fingerprints of the particular item of media content.

6. The method of claim 1, wherein obtaining the response to the request to identify an item of media content that is associated with the ambient sounds, wherein the response includes the timestamp associated with the portion of the particular item of media content that the content recognition engine has associated with the ambient sounds comprises:
    segmenting prerecorded versions of items of media content into one or more portions;
    assigning timestamps to each of the one or more portions of the prerecorded versions of the items of media content;
    obtaining one or more audio fingerprints of each of the one or more portions of the prerecorded versions of the items of media content;
    obtaining one or more audio fingerprints of the audio data representation of the ambient sounds;

comparing one or more of the audio fingerprints of the audio data representation of the ambient sounds to one or more of the audio fingerprints of one or more of the portions of the prerecorded versions of the items of media content; and identifying the timestamp associated with the portion of the particular item of media content based on detecting a match between one or more of the audio fingerprints of the audio data representation of the ambient sounds and one or more of the audio fingerprints of the portion of the particular item of media content that the content recognition engine has associated with the ambient sounds.

7. The method of claim 1, wherein obtaining the response to the request to identify a speaker that is associated with the portion of the particular item of media content that is associated with the timestamp, wherein the response identifies the particular speaker that the speaker identification engine has associated with the portion of the particular item of media content that is associated with the timestamp comprises:

accessing information that identifies timestamps and speakers associated with those timestamps for various prerecorded versions of items of media content;

identifying, based on the information that identifies timestamps and speakers associated with those timestamps for various prerecorded versions of items of media content, a particular timestamp corresponding to the timestamp associated with the portion of the particular item of media content that the content recognition engine has associated with the ambient sounds; and identifying, as the particular speaker that the speaker identification engine has associated with the portion of the particular item of media content that is associated with the timestamp, a particular speaker associated with the particular timestamp corresponding to the timestamp associated with the portion of the particular item of media content that the content recognition engine has associated with the ambient sounds.

8. The method of claim 1, wherein providing information identifying the particular speaker that the speaker identification engine has associated with the portion of the particular item of media content that is associated with the timestamp comprises:

transmitting, to a speaker knowledge base, a request to identify information that is associated with one of the speaker that the speaker identification engine has associated with the portion of the particular item of media content that is associated with the timestamp or the particular item of media content that the content recognition engine has associated with the ambient sounds;

obtaining, from the speaker knowledge base, a response to the request to identify information that is associated with one of the speaker that the speaker identification engine has associated with the portion of the particular item of media content that is associated with the timestamp or the particular item of media content that the content recognition engine has associated with the ambient sounds, wherein the response identifies information relating to the speaker that the speaker identification engine has associated with the portion of the particular item of media content that is associated with the timestamp or the particular item of media content that the content recognition engine has associated with the ambient sounds; and providing, for output, at least a portion of the information relating to the speaker that the speaker identification engine has associated with the portion of the particular item of media content that is associated with the timestamp or the particular item of media content that the content recognition engine has associated with the ambient sounds.

9. A system comprising:
one or more computers and one or more storage devices storing instructions that are operable, when executed by the one or more computers, to cause the one or more computers to perform operations comprising:

receiving (i) a request to identify a speaker, and (ii) an audio data representation of ambient sounds;

transmitting, to a content recognition engine, a request to identify an item of media content that is associated with the ambient sounds;

obtaining, from the content recognition engine, a response to the request to identify an item of media content that is associated with the ambient sounds, wherein the response includes (i) data identifying a particular item of media content that the content recognition engine has associated with the ambient sounds, and (ii) a timestamp associated with a portion of the particular item of media content that the content recognition engine has associated with the ambient sounds, and wherein the response to the request to identify an item of media content that is associated with the ambient sounds does not identify any speaker;

transmitting, to a speaker identification engine, a request to identify a speaker that is associated with the portion of the particular item of media content that is associated with the timestamp;

obtaining, from the speaker identification engine, a response to the request to identify a speaker that is associated with the portion of the particular item of media content that is associated with the timestamp, wherein the response identifies a particular speaker that the speaker identification engine has associated with the portion of the particular item of media content that is associated with the timestamp; and providing, for output, information identifying the particular speaker that the speaker identification engine has associated with the portion of the particular item of media content that is associated with the timestamp.

10. The system of claim 9, wherein receiving the audio data representation of the ambient sounds comprises:

receiving a request to identify a speaker whose voice is included among the ambient sounds; and receiving the audio data representation of the ambient sounds based on receiving the request to identify the speaker whose voice is included among the ambient sounds.

11. The system of claim 10, wherein receiving the request to identify the speaker whose voice is included among the ambient sounds comprises detecting a spoken utterance input by a user.

12. The system of claim 10, wherein receiving the request to identify the speaker whose voice is included among the ambient sounds comprises detecting a user selection of a control.

13. The system of claim 9, wherein obtaining the response to the request to identify an item of media content that is associated with the ambient sounds, wherein the response includes the timestamp associated with the portion of the particular item of media content that the content recognition engine has associated with the ambient sounds comprises:

obtaining one or more audio fingerprints of the audio data representation of the ambient sounds;

comparing one or more of the audio fingerprints of the audio data representation of the ambient sounds to one or more audio fingerprints of prerecorded versions of items of media content;

identifying the particular item of media content that the content recognition engine has associated with the ambient sounds based on determining that one or more of the audio fingerprints of the audio data representation of the ambient sounds match one or more audio fingerprints of the particular item of media content; and identifying, as the timestamp associated with the portion of the particular item of media content that the content recognition engine has associated with the ambient sounds, a particular timestamp associated with at least one of the one or more audio fingerprints of the particular item of media content.

14. The system of claim 9, wherein obtaining the response to the request to identify an item of media content that is associated with the ambient sounds, wherein the response includes the timestamp associated with the portion of the particular item of media content that the content recognition engine has associated with the ambient sounds comprises:

segmenting prerecorded versions of items of media content into one or more portions;

assigning timestamps to each of the one or more portions of the prerecorded versions of the items of media content;

obtaining one or more audio fingerprints of each of the one or more portions of the prerecorded versions of the items of media content;

obtaining one or more audio fingerprints of the audio data representation of the ambient sounds;

comparing one or more of the audio fingerprints of the audio data representation of the ambient sounds to one or more of the audio fingerprints of one or more of the portions of the prerecorded versions of the items of media content; and identifying the timestamp associated with the portion of the particular item of media content based on detecting a match between one or more of the audio fingerprints of the audio data representation of the ambient sounds and one or more of the audio fingerprints of the portion of the particular item of media content that the content recognition engine has associated with the ambient sounds.

15. The system of claim 9, wherein obtaining the response to the request to identify a speaker that is associated with the portion of the particular item of media content that is associated with the timestamp, wherein the response identifies the particular speaker that the speaker identification engine has associated with the portion of the particular item of media content that is associated with the timestamp comprises:

accessing information that identifies timestamps and speakers associated with those timestamps for various prerecorded versions of items of media content;

identifying, based on the information that identifies timestamps and speakers associated with those timestamps for various prerecorded versions of items of media content, a particular timestamp corresponding to the timestamp associated with the portion of the particular item of media content that the content recognition engine has associated with the ambient sounds; and identifying, as the particular speaker that the speaker identification engine has associated with the portion of the particular item of media content that is associated with the timestamp, a particular speaker associated with the particular timestamp corresponding to the timestamp associated with the portion of the particular item of media content that the content recognition engine has associated with the ambient sounds.

16. The system of claim 9, wherein obtaining the response to the request to identify an item of media content that is associated with the ambient sounds, wherein the response includes the timestamp associated with the portion of the particular item of media content that the content recognition engine has associated with the ambient sounds comprises:

identifying, based on the audio data representation of the ambient sounds, the particular item of media content; and identifying the timestamp associated with the portion of the particular item of media content based on determining that the ambient sounds represented by the audio data representation of the ambient sounds correspond to audio of the portion of the particular item of media content that the content recognition engine has associated with the ambient sounds.

17. A computer-readable storage device encoded with a computer program, the program comprising instructions that if executed by one or more computers cause the one or more computers to perform operations comprising:

receiving (i) a request to identify a speaker, and (ii) an audio data representation of ambient sounds;

transmitting, to a content recognition engine, a request to identify an item of media content that is associated with the ambient sounds;

obtaining, from the content recognition engine, a response to the request to identify an item of media content that is associated with the ambient sounds, wherein the response includes (i) data identifying a particular item of media content that the content recognition engine has associated with the ambient sounds, and (ii) a timestamp associated with a portion of the particular item of media content that the content recognition engine has associated with the ambient sounds, and wherein the response to the request to identify an item of media content that is associated with the ambient sounds does not identify any speaker;

transmitting, to a speaker identification engine, a request to identify a speaker that is associated with the portion of the particular item of media content that is associated with the timestamp;

obtaining, from the speaker identification engine, a response to the request to identify a speaker that is associated with the portion of the particular item of media content that is associated with the timestamp, wherein the response identifies a particular speaker that the speaker identification engine has associated with the portion of the particular item of media content that is associated with the timestamp; and providing, for output, information identifying the particular speaker that the speaker identification engine has associated with the portion of the particular item of media content that is associated with the timestamp.

18. The device of claim 17, wherein receiving the audio data representation of the ambient sounds comprises:

receiving a request to identify a speaker whose voice is included among the ambient sounds; and receiving the audio data representation of the ambient sounds based on receiving the request to identify the speaker whose voice is included among the ambient sounds.

19. The device of claim 18, wherein receiving the request to identify the speaker whose voice is included among the ambient sounds comprises detecting a spoken utterance input by a user.

20. The device of claim 17, wherein obtaining the response to the request to identify an item of media content that is associated with the ambient sounds, wherein the response includes the timestamp associated with the portion of the particular item of media content that the content recognition engine has associated with the ambient sounds comprises:
- obtaining one or more audio fingerprints of the audio data representation of the ambient sounds;
- comparing one or more of the audio fingerprints of the audio data representation of the ambient sounds to one or more audio fingerprints of prerecorded versions of items of media content;
- identifying the particular item of media content that the content recognition engine has associated with the ambient sounds based on determining that one or more of the audio fingerprints of the audio data representation of the ambient sounds match one or more audio fingerprints of the particular item of media content; and
- identifying, as the timestamp associated with the portion of the particular item of media content that the content recognition engine has associated with the ambient sounds, a particular timestamp associated with at least one of the one or more audio fingerprints of the particular item of media content.

21. The device of claim 17, wherein obtaining the response to the request to identify an item of media content that is associated with the ambient sounds, wherein the response includes the timestamp associated with the portion of the particular item of media content that the content recognition engine has associated with the ambient sounds comprises:
- segmenting prerecorded versions of items of media content into one or more portions;
- assigning timestamps to each of the one or more portions of the prerecorded versions of the items of media content;
- obtaining one or more audio fingerprints of each of the one or more portions of the prerecorded versions of the items of media content;
- obtaining one or more audio fingerprints of the audio data representation of the ambient sounds;
- comparing one or more of the audio fingerprints of the audio data representation of the ambient sounds to one or more of the audio fingerprints of one or more of the portions of the prerecorded versions of the items of media content; and
- identifying the timestamp associated with the portion of the particular item of media content based on detecting a match between one or more of the audio fingerprints of the audio data representation of the ambient sounds and one or more of the audio fingerprints of the portion of the particular item of media content that the content recognition engine has associated with the ambient sounds.

22. The device of claim 17, wherein obtaining the response to the request to identify a speaker that is associated with the portion of the particular item of media content that is associated with the timestamp, wherein the response identifies the particular speaker that the speaker identification engine has associated with the portion of the particular item of media content that is associated with the timestamp comprises:
- accessing information that identifies timestamps and speakers associated with those timestamps for various prerecorded versions of items of media content;
- identifying, based on the information that identifies timestamps and speakers associated with those timestamps for various prerecorded versions of items of media content, a particular timestamp corresponding to the timestamp associated with the portion of the particular item of media content that the content recognition engine has associated with the ambient sounds; and
- identifying, as the particular speaker that the speaker identification engine has associated with the portion of the particular item of media content that is associated with the timestamp, a particular speaker associated with the particular timestamp corresponding to the timestamp associated with the portion of the particular item of media content that the content recognition engine has associated with the ambient sounds.

23. The method of claim 1, wherein obtaining the response to the request to identify an item of media content that is associated with the ambient sounds, wherein the response includes the timestamp associated with the portion of the particular item of media content that the content recognition engine has associated with the ambient sounds comprises:
- identifying, based on the audio data representation of the ambient sounds, the particular item of media content; and
- identifying the timestamp associated with the portion of the particular item of media content based on determining that the ambient sounds represented by the audio data representation of the ambient sounds correspond to audio of the portion of the particular item of media content that the content recognition engine has associated with the ambient sounds.

* * * * *